(12) United States Patent
Cai et al.

(10) Patent No.: US 7,039,649 B2
(45) Date of Patent: May 2, 2006

(54) METHOD AND APPARATUS FOR MAINTAINING DATA INTEGRITY

(75) Inventors: Jian Cai, Sunnyvale, CA (US); Xiaotan He, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 728 days.

(21) Appl. No.: 10/150,773

(22) Filed: May 17, 2002

(65) Prior Publication Data

US 2003/0217164 A1    Nov. 20, 2003

(51) Int. Cl.
*G06F 17/30*    (2006.01)
(52) U.S. Cl. .................................... 707/102
(58) Field of Classification Search .............. 707/1–10, 707/100–104.1, 200–203; 709/229; 705/14; 711/113; 380/30
See application file for complete search history.

(56) References Cited

U.S. PATENT DOCUMENTS 5,983,228 A * 11/1999 Kobayashi et al. ........... 707/10

6,253,188 B1 * 6/2001 Witek et al. .................. 705/14
6,377,946 B1 * 4/2002 Okamoto et al. ............... 707/5

OTHER PUBLICATIONS

Jean-Louis Giavitto et al., Pattern-matching and rewriting rules for group indexed data structures, 2002, ACM Press, NY, NY, pp. 55-66.*
Brian Demsky et al., Automatic detection and repair of errors in data structures, 2003, ACM Press, NY, NY, pp. 78-95.*
Clyde Ruby et al., Safely creating correct subclasses without seeing superclass code, 2000, ACM Press, NY, NY., pp. 208-228.h.*

* cited by examiner

*Primary Examiner*—Diane Mizrahi
(74) *Attorney, Agent, or Firm*—Hickman Pslermo Truong & Becker, LLP

(57) ABSTRACT

Techniques are provided for controlling data access to maintain data integrity. A request is received to perform an action on a data element. The request is analyzed based on at least one data access rule associated with the data element. This analysis further utilizes a data structure model associated with the data element. The request is approved if the request satisfies the data access rule. The request is rejected if the request does not satisfy the data access rule.

47 Claims, 7 Drawing Sheets

| REQUEST / STATUS | READ | WRITE | DELETE |
|---|---|---|---|
| READING | APPROVED | FAIL | FAIL |
| WRITING | APPROVED | FAIL | FAIL |
| DELETING | FAIL | FAIL | FAIL |

FIG. 5

| PARENT REQUEST / CHILD STATUS | READ | WRITE | DELETE |
|---|---|---|---|
| READING | APPROVED | FAIL | FAIL |
| WRITING | FAIL | FAIL | FAIL |
| DELETING | FAIL | FAIL | FAIL |

FIG. 6

METHOD AND APPARATUS FOR MAINTAINING DATA INTEGRITY

TECHNICAL FIELD

The systems and methods described herein relate to controlling data access to maintain the integrity of a data set.

BACKGROUND

Reading and writing data is a common event in computing environments. A particular computing device may read data from an internal storage device or from an external data source coupled to the computing device. Similarly, the computing device may write data to the internal storage device or to an external data storage device. When the data read or data write operation is performed between two devices (e.g., a data source and a data destination), the procedure is relatively straightforward. However, when multiple devices attempt to read and/or write the same data at the same time, problems may occur. For example, if one user attempts to read data that is being deleted or modified by another user, the read operation may produce inaccurate data or the read operation may fail.

Similarly, if two or more users are attempting to modify or delete the same data at the same time, errors may occur. If one user deletes a particular data element while another user is attempting to modify the same data element, an error or corrupted data is likely to result. Additionally, modification of one data element may affect one or more other data elements. For example, deleting a parent data element in a data hierarchy may result in deletion of all child data elements.

One solution to these problems involves limiting the use of a data storage system to a single user at a time. Such a solution is undesirable because many users may be prevented from accessing the data storage system, even though the users are attempting to access different sets of data. This solution is particularly troublesome in web-based data storage systems that can be accessed by thousands of different users simultaneously.

Accordingly, there is a need for systems and methods that allow multiple users to access data in a data storage system but prevents users from performing operations that might jeopardize the integrity of the data set or the integrity of the data processed by the operation.

SUMMARY

The systems and methods described herein control access to data such that the integrity of the data is maintained. A control mechanism receives data access requests (e.g., read operations, write operations, or delete operations) and determines whether each particular data access request should be approved. Determining whether to approve a particular data access request includes applying one or more data access rules to the request.

In one embodiment, a system receives a request to perform an action on a data element. The request is analyzed based on at least one data access rule associated with the data element. This analysis further utilizes a data structure model associated with the data element. The request is approved if the access rule is satisfied by the request. The request is rejected if the access rule is not satisfied by the request.

In another embodiment, a system receives a hypertext transfer protocol (HTTP) request message including information relating to a requested action and a particular data element. The requested action is analyzed based on a set of data access rules associated with the data element. The requested action is executed if the requested action satisfies the set of data access rules. The requested action is rejected if the requested action does not satisfy the set of data access rules.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

FIGS. 5 and 6 illustrate two different sets of data access rules, each set being represented in the form of a table.

DETAILED DESCRIPTION

The systems and methods described herein control access to a data set to maintain the integrity of that data set. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Figure 1:
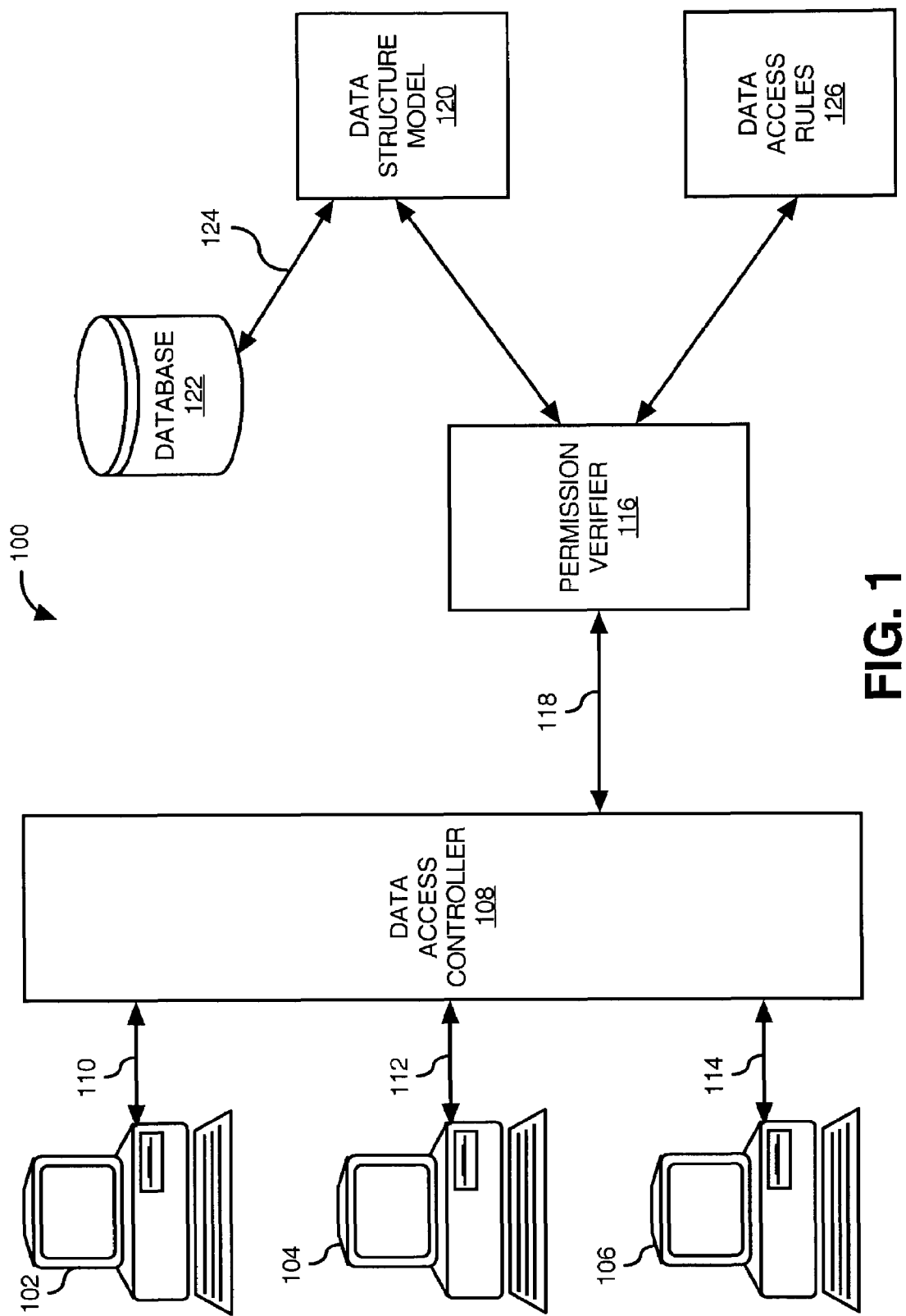
FIG. 1 illustrates an example environment in which the systems and methods discussed herein may be implemented.

FIG. 1 illustrates an example environment 100 in which the systems and methods discussed herein may be implemented. Several computing devices 102, 104 and 106 are coupled to a data access controller 108 via communication links 110, 112 and 114, respectively. Although computing devices 102, 104 and 106 are illustrated as desktop computing systems, any type of computing device can communicate with data access controller 108. Example computing devices include laptop computers, handheld computers, personal digital assistants (PDAs), cellular phones, set top boxes, game consoles and the like. Although three computing devices 102–106 are illustrated in FIG. 1, a particular environment may include any number of computing devices communicating with a particular data access controller 108.

The computing devices 102–106 shown in FIG. 1 may be located in different geographic areas, such as different offices or homes in various parts of the world. Communication links 110–114 may utilize any type of wired or wireless communication medium, or any combination of wired and wireless communication mediums. For example, one or more communication link 110–114 is established via the Internet and another communication link is established via a local area network (LAN).

Data access controller 108 receives data access requests from one or more computing devices coupled to the data access controller. These data access requests may include, for example, read data requests, write data requests, or delete data requests. Data access controller 108 parses certain information from the data access requests, such as the requested action (e.g., read, write or delete) and the data element or data node on which the action is to be performed. This parsed information is provided to a permission verifier 116 via a communication link 118. Permission verifier 116 determines whether a data access request can be fulfilled. The operation of permission verifier 116 is discussed in greater detail below. Communication link 118 can use any type of communication medium and any communication protocol(s).

Permission verifier 116 is coupled to a data structure model 120 and a set of data access rules 126. Data structure model 120 maintains dependencies and relationships among various data nodes in a database 122. Database 122 is capable of storing multiple data elements or data entries, typically in tabular format. Data structure model 120 represents the structure of the data stored in database 122, but not the data itself. For example, data structure model 120 may represent a tree structure or other arrangement of data. The information stored in data structure model 120 may also be referred to as "metadata". Data structure model 120 maintains various status information for each data node, such as read, write and delete status information. A particular data structure model may store multiple different trees and other data arrangements. Although particular types of data and data structures are discussed herein, the systems and methods described can be used with any type of data and any data structure.

Data structure model 120 communicates with database 122 periodically via a communication link 124 to update the data structure model based on changes to the data stored in the database. Although the data stored in database 122 may change frequently, the structure of that data is not likely to change as frequently. Thus, updates of data structure model 120 may be performed as a background task or performed when permission verifier 116 is not requesting data from the data structure model.

In the embodiment of FIG. 1, data access controller 108, permission verifier 116, data structure model 120 and data access rules 126 are illustrated as separate components. However, in alternate embodiments any two or more of these components can be combined with one another. In a specific embodiment, data access controller 108, permission verifier 116, data structure model 120 and data access rules 126 are contained in a server.

In a particular embodiment, environment 100 is a Java™ environment implemented using the Java 2 Enterprise Edition (J2EE) platform from Sun Microsystems, Inc. of Palo Alto, Calif. The J2EE platform is designed to provide server-side and client-side support for distributed, multi-tier applications. J2EE is a platform-independent environment that can be used to develop, build and deploy web-based enterprise applications. Enterprise JavaBeans™ (EJB) is a Java application programming interface (API) that defines a component architecture for the multi-tier client/server systems. Java and JavaBeans are trademarks of Sun Microsystems, Inc.

In this Java-based environment, requests are received as HyperText Transfer Protocol (HTTP) request messages. HTTP is the underlying protocol used by the world wide web. HTTP defines how messages are formatted and transmitted, and what actions web servers and web browsers should take in response to various commands. For example, HTTP request messages include an initial line, optional header lines, a blank line and an optional message body. The HTTP request messages use this message body to communicate an action that the originator of the request message would like to have performed and an identifier of a data element on which the action is to be performed. As mentioned above, permission verifier 116 parses this action information and data element identifier from the HTTP request. In this Java-based environment, the data access controller 108 uses Enterprise JavaBeans to make API calls to permission verifier 116 and other components.

Figure 2:
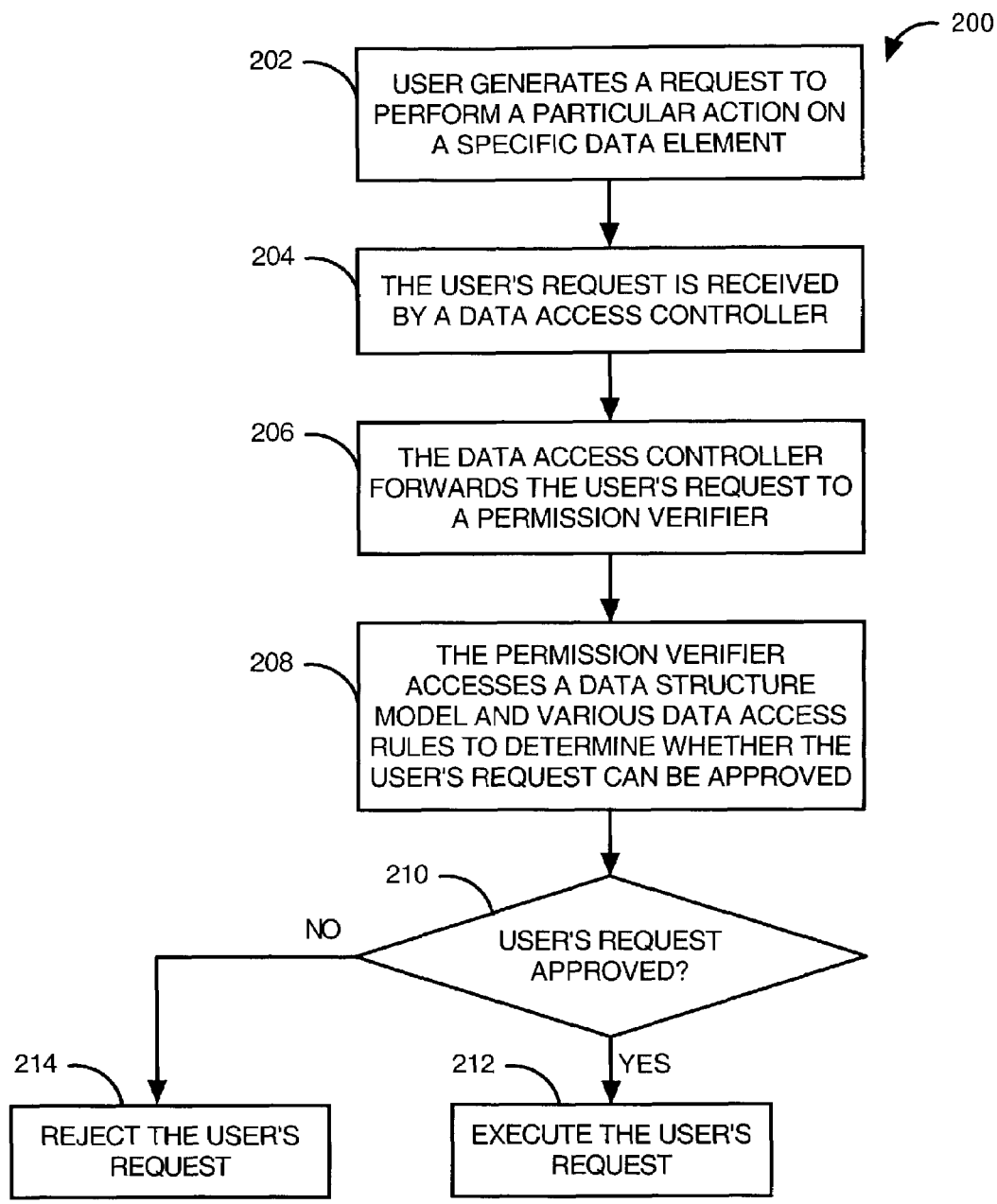
FIG. 2 illustrates a flow diagram of a procedure for handling data access requests.

FIG. 2 illustrates a flow diagram of a procedure 200 for handling data access requests. Initially, a user generates a request to perform a particular action on a specific data element (block 202). The user's request is received by a data access controller (block 204), such as data access controller 108 shown in FIG. 1. The data access controller then forwards the user's request to a permission verifier (block 206), such as permission verifier 116 shown in FIG. 1. The permission verifier accesses a data structure model and various data access rules to determine whether the user's request should be approved (block 208). If the user's request is approved, the procedure executes the user's request (block 212). However, if the user's request is not approved, the user's request is rejected (block 214).

Figure 3:
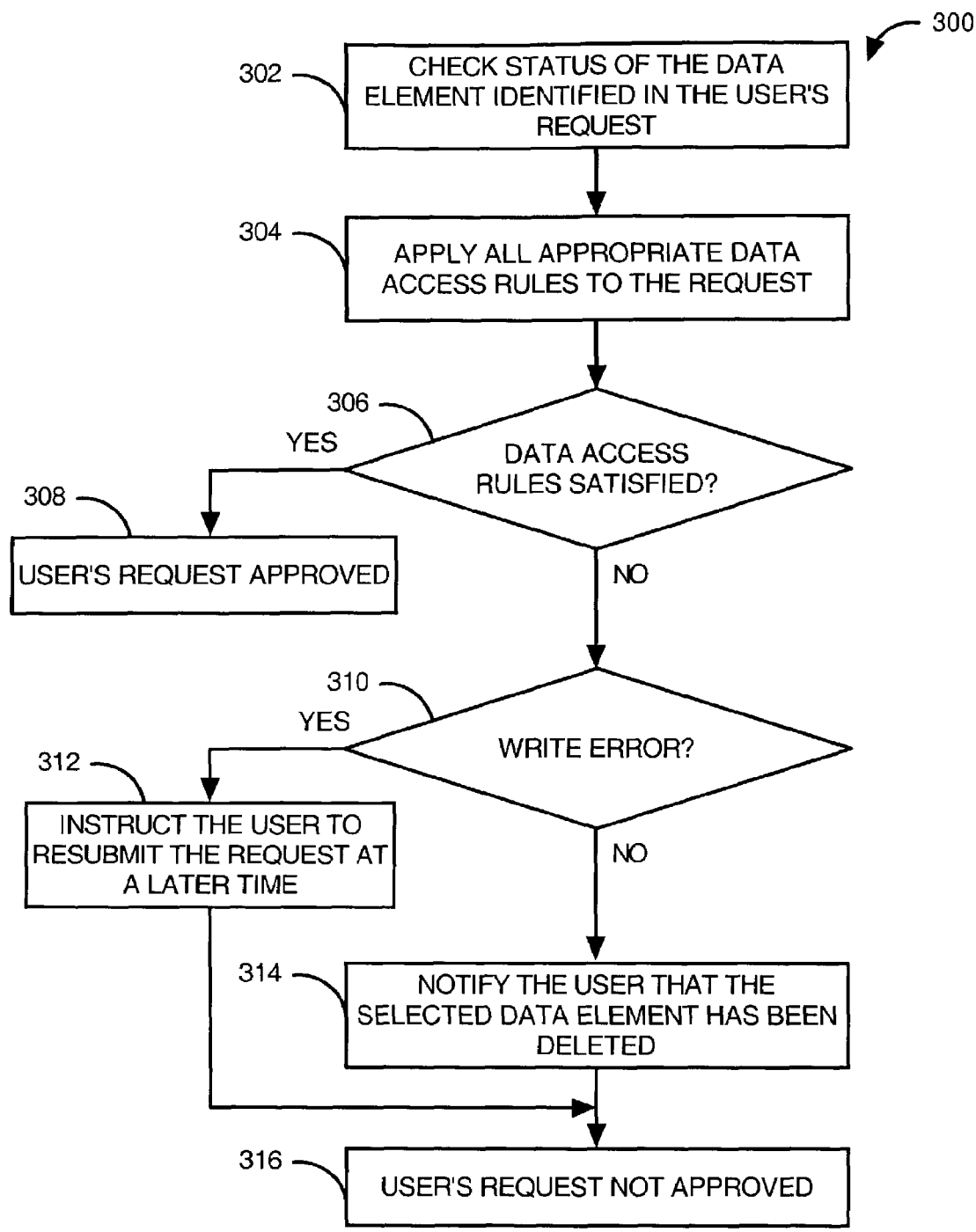
FIG. 3 illustrates a flow diagram of a procedure for determining whether to approve a request to perform a particular action on a particular data element.

FIG. 3 illustrates a flow diagram of a procedure 300 for determining whether to approve a request to perform a particular action on a particular data element. Initially, the procedure checks the status of the data element identified in the user's request (block 302). This status is stored in the data structure model 120 (FIG. 1). Accessing information from the data structure model is considerably faster than accessing similar information from the actual data storage device, such as database 122 (FIG. 1). Typically, accessing a database is slow due to the constantly changing data and the large volumes of data flowing into and out of the database. In contrast, since the data structure model stores dependencies rather than the actual data, the data changes less frequently and the data can be accessed much faster.

The procedure then applies appropriate data access rules to the request (block 304). Depending on the situation, one or more of the data access rules may not be appropriate for a particular user. For example, if the request is to delete a data entry, rules relating to reading a data entry or writing a data entry are not likely to be applicable to the request.

At block 306, the procedure 300 determines whether the appropriate data access rules have been satisfied. If so, the user's request is approved at block 308. However, if the appropriate access rules are not satisfied, the procedure continues to block 310 to determine whether a write error occurred. If so, the user is instructed to resubmit the request at a later time (block 312).

In a particular embodiment, the data access controller or the permission verifier maintains a log of the average amount of time spent implementing a particular type of action. For example, a typical write action may take ten minutes while a typical delete action may takes a few seconds. Although an actual write operation may take less than a second, the system tracks the total time a user spends modifying data and performing other tasks before finally writing the new or modified data to a database, thereby allowing another user to access the data that was being modified. The instruction given to the user to resubmit the request gives an approximate time that the user should resubmit the request. This approximate time is based on data in the log regarding the average amount of time spent implementing the current action. Alternatively, the instruction may instruct the user to wait a particular time period before resubmitting the request instead of providing a specific time.

Referring again to FIG. 3, if a write error did not occur, then it is likely that a delete error occurred. In a particular embodiment, there are two error messages that can result in denying a requested action: a write error and a delete error. The write error indicates that another user is modifying the same data element. The delete error indicates that the data element has been deleted. Since a write error was not detected in block 310, the procedure continues to block 314 knowing that the error generated is a delete error. At block 314, the user is notified that the selected data element has been deleted. Finally, the user's request is not approved (block 316), so the user's request is rejected at block 214 in FIG. 2.

Figure 4:
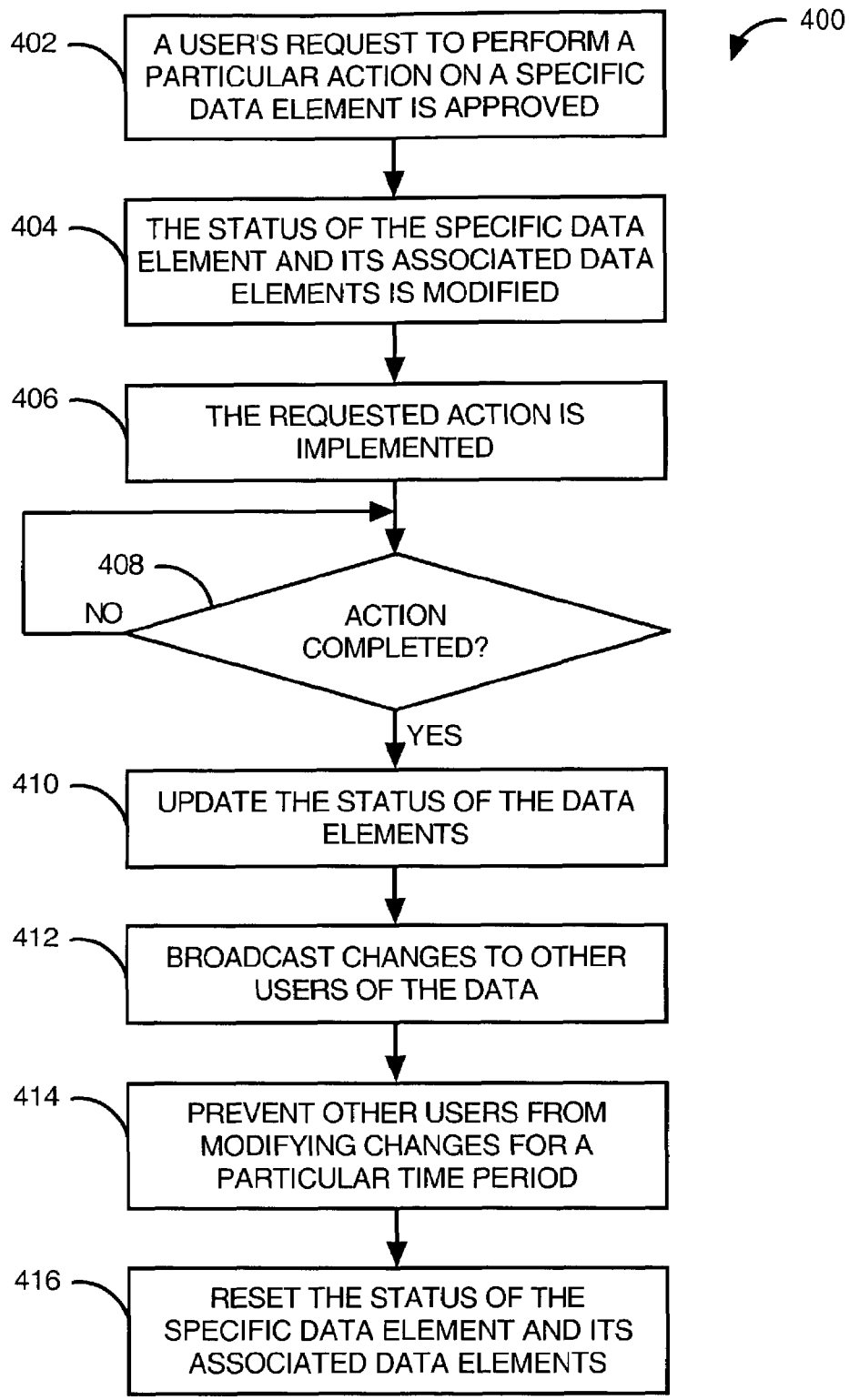
FIG. 4 illustrates a flow diagram of a procedure for controlling access to a data element when that data element is being modified.

FIG. 4 illustrates a flow diagram of a procedure 400 for controlling access to a data element when that data element is being modified. Initially, a user's request to perform a particular action on a specific data element is approved (block 402). The status of the specific data element and its associated data elements is modified to indicate the current action being performed (block 404). By changing the status, other users are prevented from performing actions on the data element (and its associated data elements) that might affect the integrity of the data. Associated data elements are those elements that might be affected by the action being performed. For example, if the data structure is a hierarchy, the associated data elements may include parent elements of the specific data element and/or child elements of the specific data element. Parent elements are typically higher in the hierarchy than the specific data element and child elements are typically lower in the hierarchy than the specific data element. The associated data elements may also include data elements on the same level of the hierarchy as the specific data element. In this hierarchy example, if the specific data element is deleted, all data elements that descend from the specific data element are also deleted. Thus, it is desirable to prevent other users from performing any action with respect to those data elements that are likely to be deleted.

After modifying the status of the appropriate data elements, the requested action is implemented (block 406). Block 408 checks to see whether the requested action is complete. When the requested action is complete, the status of the data elements (e.g., the specific data element being modified and its associated data elements) is updated in the data structure model (block 410). Next, the change that resulted from the requested action is broadcast to other users of the data (block 412), thereby allowing the other users to view the change, if desired. The changes may be "broadcast" via email, an instant messaging service, or other communication mechanism. In a particular embodiment, multiple users are collaborating on a project involving a data structure of the type discussed herein. In this embodiment, the other users collaborating on the project are notified of the change. The other users can approve the change, disapprove the change, or make further modifications.

To give all users an opportunity to view changes, the procedure 400 prevents other users from modifying changes for a particular time period (block 414). Depending on the magnitude of the changes, the number of other users and/or the typical frequency with which the other users access the data, the time period may vary from a few minutes to a few days or longer. In specific embodiments, the time period may be of any duration. After the time period has passed, the status of the specific data element and its associated data elements is reset to an "available" or "unlocked" state (block 416), thereby allowing other users to perform actions on the data elements.

FIGS. 5 and 6 illustrate two different sets of data access rules 500 and 600, each set being represented in the form of a table. Data access rules 500 identify the results of a requested action on a particular data element based on the current status of that data element. A first column 502 identifies the current status of the particular data element (i.e., reading data element, writing to data element and deleting data element). The next column 504 identifies the three results associated with a request to read the particular data element. If the status is "reading", the read request is approved. If the status is "writing", the read request is also approved. However, if the status is "deleting", the read request is not approved (i.e., the request fails). A third column 506 identifies the three results associated with a request to write to the particular data element. In the example of FIG. 5, all results in this column are a failure of the request. A fourth column 508 identifies the three results associated with a request to delete the particular data element. Again, all results in this column are a failure of the request.

Data access rules 600 identify the results of an action requested by a parent data element based on the current status of an associated child. A first column 602 identifies the current status of the particular data element. The next column 604 identifies the three results associated with a request to read the particular data element. If the status is "reading", the read request is approved. If the status is "writing" or "deleting", the read request is not approved (the request fails). A third column 606 identifies the three results associated with a request to write to the particular data element. In the example of FIG. 6, all results in this column are a failure of the request. A fourth column 608 identifies the three results associated with a request to delete the particular data element. Again, all results in this column are a failure of the request. Although data access rules 500 and 600 are very similar, alternate embodiments may have significantly different data access rules for individual data elements as compared to parents retrieving data based on the status of one or more associated children.

The data access rules 500 and 600 represent example results of various requests based on the status of a data element. In alternate embodiments, one or more of the results illustrated in FIG. 5 and/or FIG. 6 can be changed, based on the desired operating characteristics of the system. In other embodiments, one or more data access rules may be defined using a different mechanism, such as a set of logical conditions, rather than using a table format. An example set of logical conditions is:

---

IF Request=Read AND (Status=Reading OR Status=Writing) THEN Approved
IF Request=Read AND Status=Deleting THEN Fail -continued If(Request=Write OR Request=Delete) AND (Status=Reading OR Status=Writing OR Status=Deleting) THEN Fail Various other techniques can be used to define one or more data access rules that are applied to data access requests.

Figure 7:
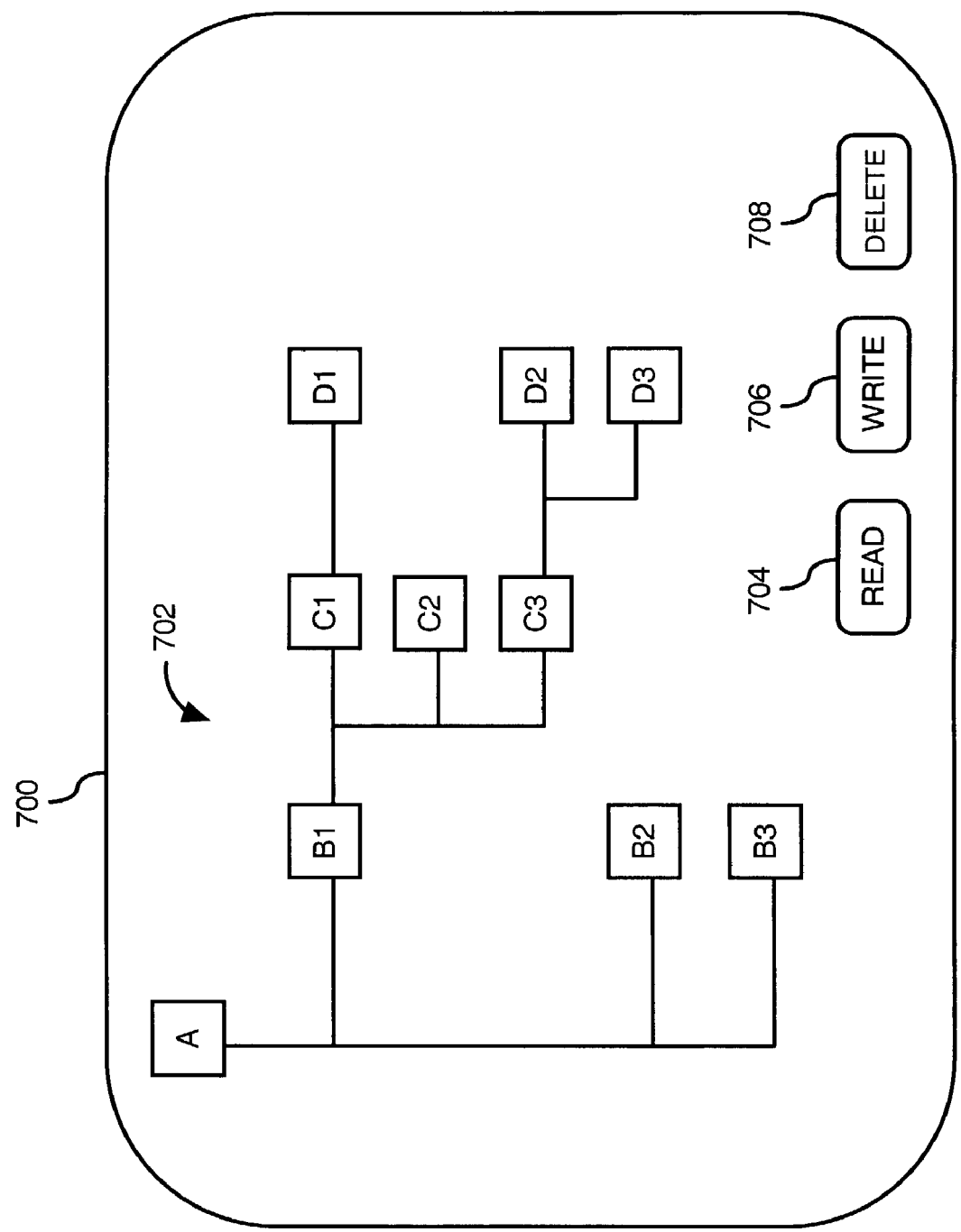
FIG. 7 illustrates a display screen containing an example data structure model associated with data stored in a data storage device.

FIG. 7 illustrates a display screen 700 containing an example data structure model 702 associated with data stored in a data storage device. Display screen 700 also includes three action buttons 704, 706 and 708, labeled "Read", "Write" and "Delete", respectively. The three action buttons 704–708 allow a user to request a particular action. Prior to selecting a particular action, the user selects a particular data element in the data structure model 702. For example, if a user wants to delete the data element labeled "C3", along with its two children D2 and D3, the user selects data element C3 and activates the Delete button 708. Depending on the status of data element C3 and the status of its associated data elements (such as children D2 and D3, parent B1 and grandparent A), the Delete action may be approved or rejected (e.g., following one or more of the procedures discussed above).

In a particular example, data structure model 702 represents the data associated with a collaborative project involving multiple users. In this example, it is important that each of the multiple users has an opportunity to review changes to the data entered by another user. Thus, when a change is made by one user, other users are notified of the change. The status of the data element (or elements) associated with the change is locked for a period of time to allow other users to see the change before another user enters further changes, deletes the previous changes, or deletes the data element.

FIG. 7 illustrates an example interface that allows a user to view a data structure and enter data access requests. In alternate embodiments, a user may utilize a browser application, a collaboration application, or any other application program to locate and view various data structures as well as to submit data access requests.

Figure 8:
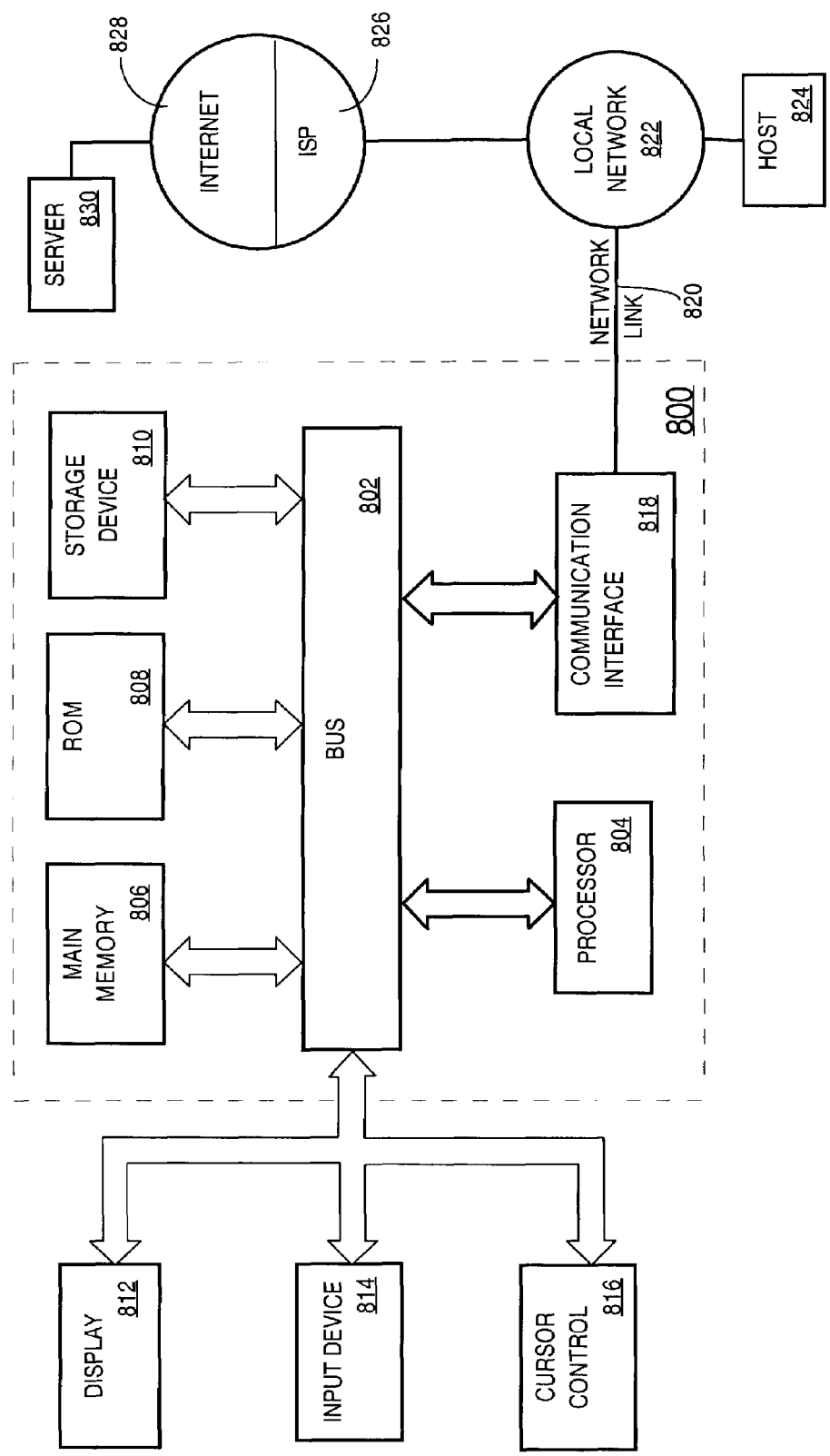
FIG. 8 is a block diagram that illustrates a computer system upon which the procedures discussed herein may be implemented.

FIG. 8 is a block diagram that illustrates a computer system 800 upon which the procedures discussed herein may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The described systems and methods are related to the use of computer system 800 for implementing various techniques described herein. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the systems and methods described herein. Thus, the described systems and methods are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

What is claimed is:

1. A computer-implemented method comprising:
receiving a request to perform an action on a data element;
analyzing the request to perform an action based on at least one data access rule associated with the data element, wherein analyzing the request to perform an action further utilizes a data structure model associated with the data element;
approving the request to perform an action if the request satisfies the at least one access rule; and
rejecting the request to perform an action if the request is does not satisfy the at least one access rule.

2. The method of claim 1 wherein the data structure model maintains a status associated with each data element.

3. The method of claim 1 wherein the data structure model maintains a status associated with each data element, and wherein analyzing the request to perform an action includes analyzing a status associated with the data element.

4. The method of claim 1 wherein the data structure model maintains a status associated with each data element, and wherein approving the request to perform an action includes considering a status associated with the data element.

5. The method of claim 1 wherein the data structure model identifies relationships between the data element and at least one other data element.

6. The method of claim 1 wherein the data structure model identifies relationships between the data element and at least one other data element, and wherein approving the request to perform an action includes considering the relationship between the data element and the at least one other data element.

7. The method of claim 1 further comprising analyzing the request to perform an action based on a data structure model associated with the data element.

8. The method of claim 1 wherein the at least one data access rule is associated with a plurality of data elements.

9. The method of claim 1 wherein the at least one data access rule is associated with a data read operation.

10. The method of claim 1 wherein the at least one data access rule is associated with a data write operation.

11. The method of claim 1 wherein the at least one data access rule is associated with a data delete operation.

12. The method of claim 1 wherein the data element is a node in a data structure model.

13. The method of claim 1 wherein the request is a hypertext transfer protocol request message including information regarding the action to be performed.

14. The method of claim 1 wherein the request to perform an action is a hypertext transfer protocol request message including information regarding the data element on which the action is to be performed.

15. The method of claim 1 wherein rejecting the request further comprises:
determining a typical time period that a data element is unavailable during a data access operation; and
instructing the source of the request to resubmit the request to perform an action after the typical time period.

16. A computer-implemented method comprising:
receiving a hypertext transfer protocol (HTTP) request message including information relating to a requested action and a particular data element;
analyzing the requested action based on a set of data access rules associated with the data element;
executing the requested action if the requested action satisfies the set of data access rules; and
rejecting the requested action if the request does not satisfy the set of data access rules.

17. The method of claim 16 wherein the data access rules are analyzed with reference to a data structure model associated with the data element.

18. The method of claim 16 wherein analyzing the requested action is further based on relationships between the particular data element and at least one other data element.

19. The method of claim 16 wherein analyzing the requested action is further based on a status associated with the data element.

20. The method of claim 16 wherein executing the requested action includes changing a status of the particular data element to prevent other requested actions from being executed on the particular data element.

21. The method of claim 20 further comprising resetting the status of the particular data element after completing the requested action.

22. The method of claim 20 further comprising preventing modification of the particular data element for a period of time after completing the requested action.

23. A computer-implemented method comprising:
generating a request to perform an action on a data element;
communicating the request to perform an action to a data access controller, the data access controller being configured to analyze the request to perform an action based on at least one data access rule and a data structure model, wherein the data structure model is associated with the data element;
receiving an approval to perform the action if the request satisfies the at least one data access rule; and
receiving a rejection with respect to performing the action if the request does not satisfy the at least one data access rule.

24. The method of claim 23 wherein the data structure model maintains metadata associated with a set of data.

25. The method of claim 23 wherein the data structure model identifies a status associated with the data element.

26. The method of claim 23 wherein the data structure model identifies a status associated with the data element and further identifies relationships between the data element and a plurality of other data elements.

27. A computer-readable storage medium comprising:
instructions for causing one or more processors to receive a request to perform an action on a data element;
instructions for causing one or more processors to analyze the request to perform an action based on a plurality of data access rules and a data structure model, wherein the data structure model is associated with the data element;
instructions for causing one or more processors to approve the request to perform an action if the request satisfies the plurality of data access rules; and
instructions for causing one or more processors to reject the request to perform an action if the request does not satisfy the plurality of data access rules.

28. An apparatus comprising:
a data access controller configured to receive data access requests from a plurality of computing devices;
a permission verifier coupled to the data access controller and configured to determine whether to approve a particular data access request;
a data structure model coupled to the permission verifier, wherein the data structure model identifies relationships between a plurality of data elements; and
a plurality of data access rules accessible by the permission verifier, wherein the plurality of data access rules are applied by the permission verifier when determining whether to approve a particular data access request.

29. The apparatus of claim 28 further comprising a set of data coupled to the data structure model, wherein the data structure model identifies relationships between data elements in the set of data.

30. The apparatus of claim 29 wherein the data structure model periodically receives updated data structure information from the set of data.

31. An apparatus comprising:
means for receiving a request to perform an action related to a data element;
means for analyzing the request to perform an action based on a data access rule;
means for identifying a data structure model associated with the data element;
means for executing the request to perform an action if the request satisfies the data access rule; and
means for rejecting the request to perform an action if the request does not satisfy the data access rule.

32. The apparatus of claim 31 wherein the means for analyzing the request further utilizes the data structure model to analyze the request to perform an action.

33. The apparatus of claim 31 wherein the received request is a hypertext transfer protocol request message including information regarding the action and an identity of the data element on which the action is to be performed.

34. The computer-readable storage medium of claim 27 wherein the data structure model maintains a status associated with each data element.

35. The computer-readable storage medium of claim 27 wherein the data structure model maintains a status associated with each data element, and wherein analyzing the request to perform an action includes analyzing a status associated with the data element.

36. The computer-readable storage medium of claim 27 wherein the data structure model maintains a status associated with each data element, and wherein approving the request to perform an action includes considering a status associated with the data element.

37. The computer-readable storage medium of claim 27 wherein the data structure model identifies relationships between the data element and at least one other data element.

38. The computer-readable storage medium of claim 27 wherein the data structure model identifies relationships between the data element and at least one other data element, and wherein approving the request to perform an action includes considering the relationship between the data element and the at least one other data element.

39. The computer-readable storage medium of claim 27 further comprising analyzing the request to perform an action based on a data structure model associated with the data element.

40. The computer-readable storage medium of claim 27 wherein the at least one data access rule is associated with a plurality of data elements.

41. The computer-readable storage medium of claim 27 wherein the at least one data access rule is associated with a data read operation.

42. The computer-readable storage medium of claim 27 wherein the at least one data access rule is associated with a data write operation.

43. The computer-readable storage medium of claim 27 wherein the at least one data access rule is associated with a data delete operation.

44. The computer-readable storage medium of claim 27 wherein the data element is a node in a data structure model.

45. The computer-readable storage medium of claim 27 wherein the request is a hypertext transfer protocol request message including information regarding the action to be performed.

46. The computer-readable storage medium of claim 27 wherein the request to perform an action is a hypertext transfer protocol request message including information regarding the data element on which the action is to be performed.

47. The computer-readable storage medium of claim 27 wherein rejecting the request further comprises:
determining a typical time period that a data element is unavailable during a data access operation; and
instructing the source of the request to resubmit the request to perform an action after the typical time period.

* * * * *